April 8, 1969

L. C. DUKE 3,436,879

DRIVE-IN ADVERTISER

Filed July 13, 1966

INVENTOR.
Louie C. Duke

BY Hill, Sherman, Meroni, Gross & Simpson  ATTORNEYS

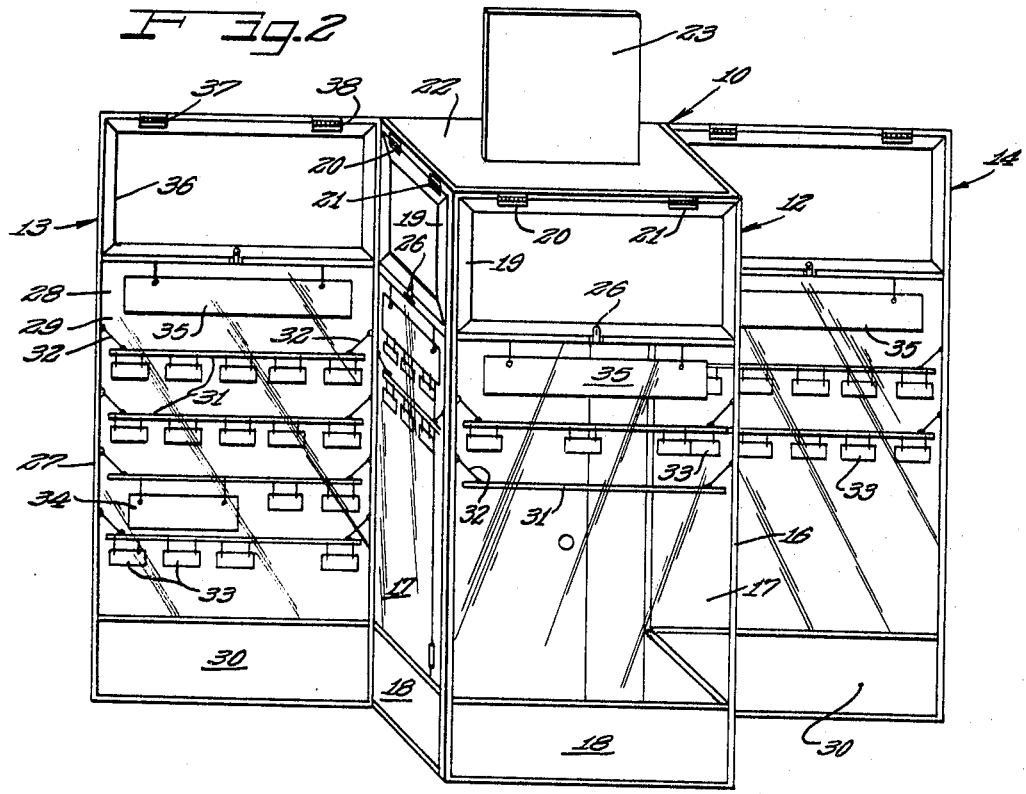
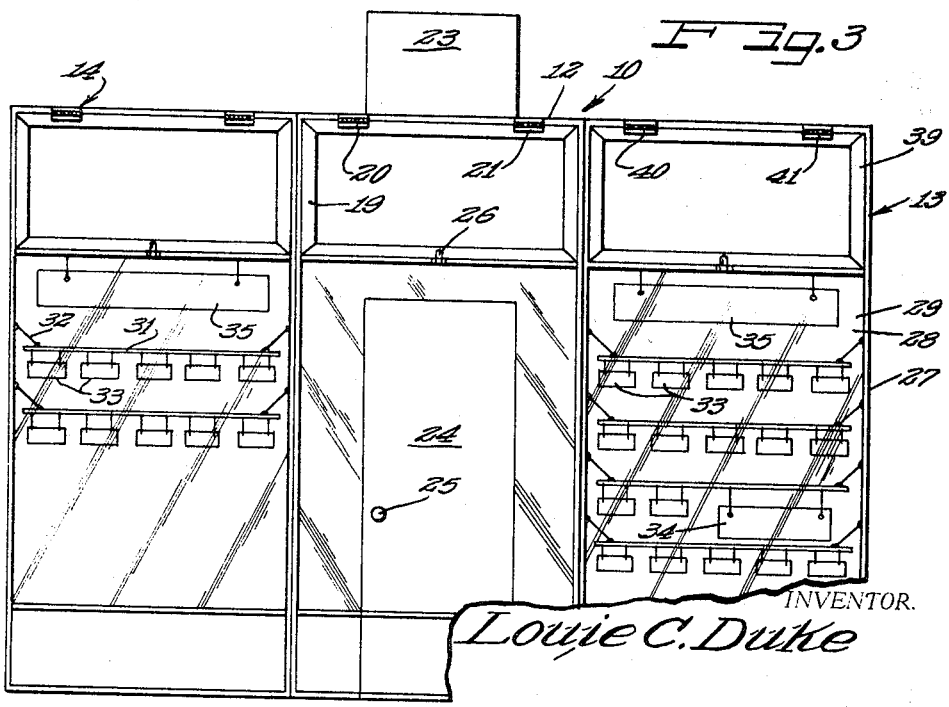

_United States Patent Office_

3,436,879
Patented Apr. 8, 1969

3,436,879
DRIVE-IN ADVERTISER
Louie C. Duke, 525 S, Main St.,
Greenville, Miss. 38701
Filed July 13, 1966, Ser. No. 564,866
Int. Cl. E04h 1/12; G09f 7/00
U.S. Cl. 52—38                           2 Claims

ABSTRACT OF THE DISCLOSURE

A drive-in advertising structure wherein a stationary housing having a plurality of upright walls forming an enclosure has wing portions hingedly connected to opposite parallel corners. Each of the walls and each of the wing portions carry indicia-bearing sheet form members of various size either for advertising purposes or as a means of disseminating other useful information in the community.

---

An object of the present invention is to provide a new and improved advertising stand which is both functional in that it will accommodate a multiplicity of different types of advertisements as well as being aesthetic to attract people to the advertisements thereon.

Another object of the present invention is to provide an advertising stand which occupies a minimum of support space but which offers a large surface area for advertising purposes.

Still another object of the present invention is to provide an advertising stand which can be manufactured as a package unit and readily transported to the site where it is to be used.

A further object of the present invention is to provide an advertising stand which can be used for long term advertising as well as short term advertising.

A still further object of the present invention is to provide a structure which not only functions as an advertising stand but which also functions as a means of disseminating other useful information in the community in which it is placed.

Yet another object of the present invention is to provide an advertising structure which is simple to construct and inexpensive to manufacture, since the structure incorporates a minimum number of different kinds of components.

A feature of the present invention is the construction of an advertising stand having a plurality of fold-out advertising surfaces which have one position to facilitate shipping of the stand to the site and another position to facilitate advertising.

Briefly, the advertising stand of the present invention includes a substantially transparent housing having an access door to permit entrance to the housing so that advertisements and information cards may be placed therein in such a manner as to be visible through the transparent walls of the housing. The housing is provided with a pair of foldout wings which provide additional advertising surface for the stand. The fold-out wings may be placed in a closed position adjacent the housing to facilitate shipping of the stand from its place of manufacture to the place of use, and then the wings may be in an extended position to provide maximum advertising surface area.

Larger panels on each wing and each respective wall are provided with hinged covers, thereby facilitating the use of such panels as semi-permanent displays or long term display areas.

The lower areas are equipped with cross bar suspension means from which small cards such as 3" x 5" information cards may be suspended in rows and columns.

Other objects and features of the present invention will be more fully realized and understood from the following detailed description when taken in conjunction with the accompanying drawings in which like reference numerals throughout the various views of the drawings are intended to designate similar elements or components and wherein:

In the drawings:

FIGURE 2 is a front perspective view of one of the advertising stands of FIGURE 1; and FIGURE 3 is an elevational view showing the rear of the advertising stand of FIGURE 2.

As shown on the drawings:

Figure 1:
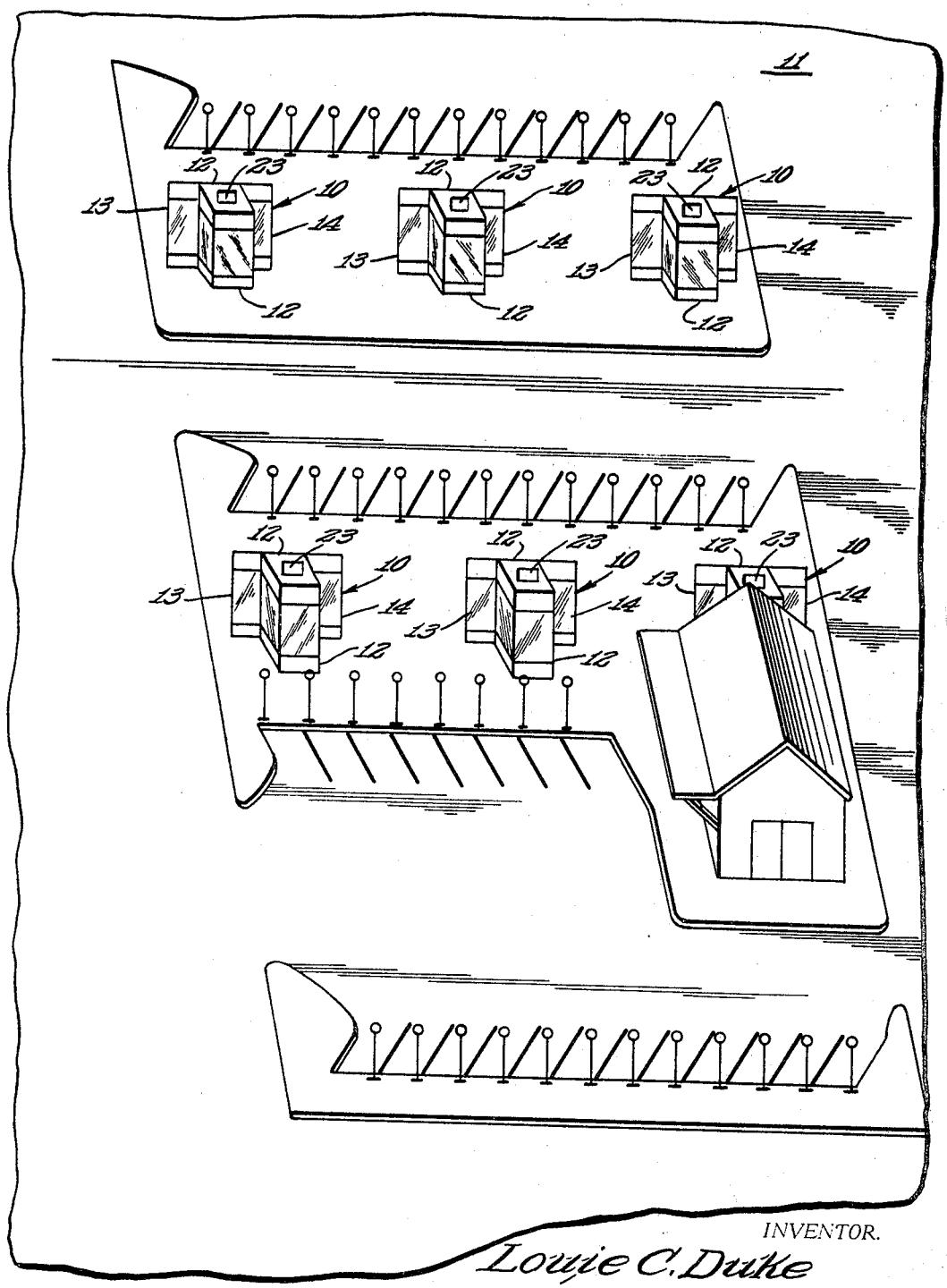
FIGURE 1 is a perspective view showing a plurality of advertising stands which are constructed in accordance with the principles of this invention, and which stands are placed in a parking lot.

As seen in FIGURE 1, a plurality of advertising stands, each designated generally by reference numeral 10, are positioned within the area of a parking lot 11. Although the illustrated embodiment of the present invention shows the advertising stands as being placed in a parking lot, it is not to be construed in a limiting sense. The advertising stands 10 may be placed in most any area where passers-by may avail themselves to the information posted thereon.

Seen in FIGURE 2 is the detailed construction of one of the advertising stands 10. The advertising stand 10 has a housing 12, and a pair of extendible wings 13 and 14 secured thereto. The wing portions 13 and 14 may be hinged to the housing 12 and fold-out therefrom when permanently placed in the area where it is to be used. However, the wing portions 13 and 14 may be fixedly secured to the housing 12 if desired. The housing 12 consists of a frame assembly 16 for receiving transparent side wall portions 17. Each of the side walls of the housing 12 is provided with a solid lower portion 18, preferably of non-transparent material. The lower portions 18 may be utilized for permanent advertisements of various kinds.

Each of the side walls of the housing 12 is further provided with a window 19 which is secured to the side wall by a pair of hinges 20 and 21. Each of the windows 19 may have a solid non-transparent back and a transparent front surface for receiving relatively large advertising cards therebetween. In using the term "cards" reference is intended to any indicia bearing sheet form member, whether opaque or a transparency, so long as it is capable of featuring a display or message.

A roof 22 is secured to the frame assembly 16. Mounted on the roof 22 is a header 23 which is used to identify the kinds or categories of advertisements in the specific structure. Although the header 23 is shown herein as being rectangular, it will be understood that the header may take other aesthetic geometric forms if desired. Thus, in a typical parking lot layout as shown in FIGURE 1, each structure 10 may contain a different category as identified on the header 23. For example, one could feature "antiques," another "automobiles" and still another "restaurants," etc.

As best seen in FIGURE 3, the housing 12 is provided with a door 23 which permits access to the interior of the housing 12. The door 24 is provided with a doorknob 25 which may include suitable locking means to lock the door closed to prevent unauthorized persons from entering the housing. Therefore, advertising cards which are positioned within the interior of the housing may be viewed from the exterior thereof, and such cards can be readily changed. Furthermore, each of the windows 19 is provided with a latch 26 which is herein shown as being on the exterior surface of the housing 12. However, the latches 26 may be positioned within the interior of the housing 12, and the advertising cards mounted on the windows 19 may also be changed from within the housing.

The extendible wing portion 13 is constructed of a frame 27 which receives a non-transparent backing portion 28 and a transparent wall portion 29 overlying the backing portion 28 and on opposite sides thereof. Therefore, advertising surface area is provided on both sides of the wing portion 13. The wing 13 has a solid non-transparent bottom portion 30 which is similar to the bottom portions 18 of the housing 12. Mounted within the narrow space between the backing portion 28 and the transparent wall portion 29, is a plurality of bars 31 which are secured or suspended within the space by hooks 32.

Therefore, advertising cards, preferably having a dimension of 3" x 5" as indicated by reference numeral 33, can be placed between the solid backing portion 28 and the transparent wall portion 29. Also, larger cards, as indicated by reference numerals 34 and 35, may be placed therebetween.

The extendible wing 13 is provided with a window 36 which is secured thereto by a pair of hinges 37 and 38. As seen in FIGURE 3, the back side of the extendible wing 13 is also provided with a window 39 which is secured thereto by a pair of hinges 40 and 41.

It will be understood that the construction of the extended wing portion 14 is substantially the same as that of the extended wing portion 13 and, accordingly like reference numerals have been applied.

Therefore, the present invention has provided a new and improved advertising structure which can be readily mass produced at a minimal cost since the structure incorporates a minimum number of different kinds of components. Furthermore, the advertising structure of the present invention provides maximum advertising surface area while occupying a minimum of support space.

It should be understood that I wish to embody within the scope of the patent warranted hereon all such modifications coming within the scope of my contribution to the art.

I claim as my invention:
1. An advertising structure comprising:
   a housing having a plurality of upright walls forming an enclosure,
   and a plurality of upright wing portions secured to said housing and extending outwardly from said enclosure,
   each of said walls and said wing portions having means for supporting indicia bearing sheet form members of various size,
   said upright walls comprising a frame assembly defining four vertical walls having adjacent walls disposed at right angles to one another,
   said walls positioned within said frame assembly comprising panels of transparent material in a frame assembly,
   a door secured to one wall of said housing to permit access to the interior of said enclosure,
   indicia bearing sheet form members, and means within said housing for securing said indicia bearing sheet form members in such a manner that the indicia members are visible through said transparent walls from the exterior of said housing,
   said wing portions each including a frame secured to said housing,
   and first and second transparent walls positioned within said frame defining a space between said walls for receiving said sheet form members,
   a non-transparent backing between said walls, thereby dividing said space into substantially two equal areas for receiving advertisements in each area.

2. The structure of claim 1 further including a header mounted on top of said housing for receiving advertisements thereon.

References Cited

UNITED STATES PATENTS

| | | | |
|---|---|---|---|
| 766,373 | 8/1904 | McElhenie | 312—234 X |
| 282,794 | 8/1883 | Starling | 52—71 X |
| 1,012,855 | 12/1911 | Hosch | 40—124 |
| 1,327,248 | 1/1920 | Moody | 52—65 X |
| 1,484,231 | 2/1924 | Pistocco | 40—128 |
| 2,049,857 | 8/1936 | Naeser | 40—128 |
| 2,193,207 | 3/1940 | Rosen | 52—38 X |
| 2,315,158 | 3/1943 | Markham | 52—38 X |
| 3,005,277 | 10/1961 | Sherron | 52—38 X |

FOREIGN PATENTS

| | | |
|---|---|---|
| 592,578 | 5/1925 | France. |
| 1,093,345 | 11/1954 | France. |
| 4,001 | 3/1886 | Great Britain. |
| 622,851 | 7/1961 | Italy. |

FRANK L. ABBOTT, *Primary Examiner.*

C. G. MUELLER, *Assistant Examiner.*

U.S. Cl. X.R.

40—125; 52—65, 174